United States Patent [19]
Belknap et al.

[11] Patent Number: 6,070,228
[45] Date of Patent: May 30, 2000

[54] MULTIMEDIA DATA STORAGE SYSTEM AND METHOD FOR OPERATING A MEDIA SERVER AS A CACHE DEVICE AND CONTROLLING A VOLUME OF DATA IN THE MEDIA SERVER BASED ON USER-DEFINED PARAMETERS

[75] Inventors: William Russell Belknap, San Jose; Steven K. Elliot, Palo Alto; Gerald Edward Kozina, Cupertino; Tram Thi Mai Nguyen, San Jose, all of Calif.

[73] Assignee: International Business Machines Corp., Armonk, N.Y.

[21] Appl. No.: 08/940,275

[22] Filed: Sep. 30, 1997

[51] Int. Cl.[7] .............................. G06F 12/00; G06F 13/00
[52] U.S. Cl. .......................... 711/118; 711/161; 711/154; 709/219
[58] Field of Search ................................. 711/3, 118, 154, 711/161; 395/200.09, 200.49; 710/35; 707/9; 709/219

[56] References Cited

U.S. PATENT DOCUMENTS

| | | | |
|---|---|---|---|
| 5,511,208 | 4/1996 | Boyles et al. | 395/800 |
| 5,586,264 | 12/1996 | Belknap et al. | 395/200.49 |
| 5,603,058 | 2/1997 | Belknap et al. | 710/35 |
| 5,611,049 | 3/1997 | Pitts | 395/200.09 |
| 5,649,185 | 7/1997 | Antognini et al. | 395/609 |

Primary Examiner—Tuan V. Thai
Attorney, Agent, or Firm—Sughrue, Mion, Zinn, Macpeak & Seas, PLLC

[57] ABSTRACT

The present invention is directed to a multimedia data storage system for storing multimedia data including a media server which stores media data on a short-term basis, and a media archive which stores media data on a long-term basis relative to the media server. The media archive is connected to the media server, which operates as a cache device for the media archive, for transmission of media data between the media archive and the media server. According to the present invention, a volume of the media data stored in the media server is controlled based on user-defined parameters. The present invention is also directed to a method of managing a media server as a cache device for a media archive within a multimedia data storage system. The media server stores media data on a short-term basis, whereas the media archive stores media data on a long-term basis relative to the media server. The media archive is connected to the media server for transmission of media data therebetween. According to the present invention, the method of managing includes determining a volume of the media data stored in the media server and controlling the volume of the media data stored in the media server based on user-defined parameters. The present invention is also directed to a computer-readable medium of instructions to be implemented in a multimedia data storage system including a media server and a media archive. The media server stores media data on a short-term basis and the media archive stores media data on a long-term basis relative to the media server. The media archive is connected to the media server for transmission of media data therebetween.

12 Claims, 8 Drawing Sheets

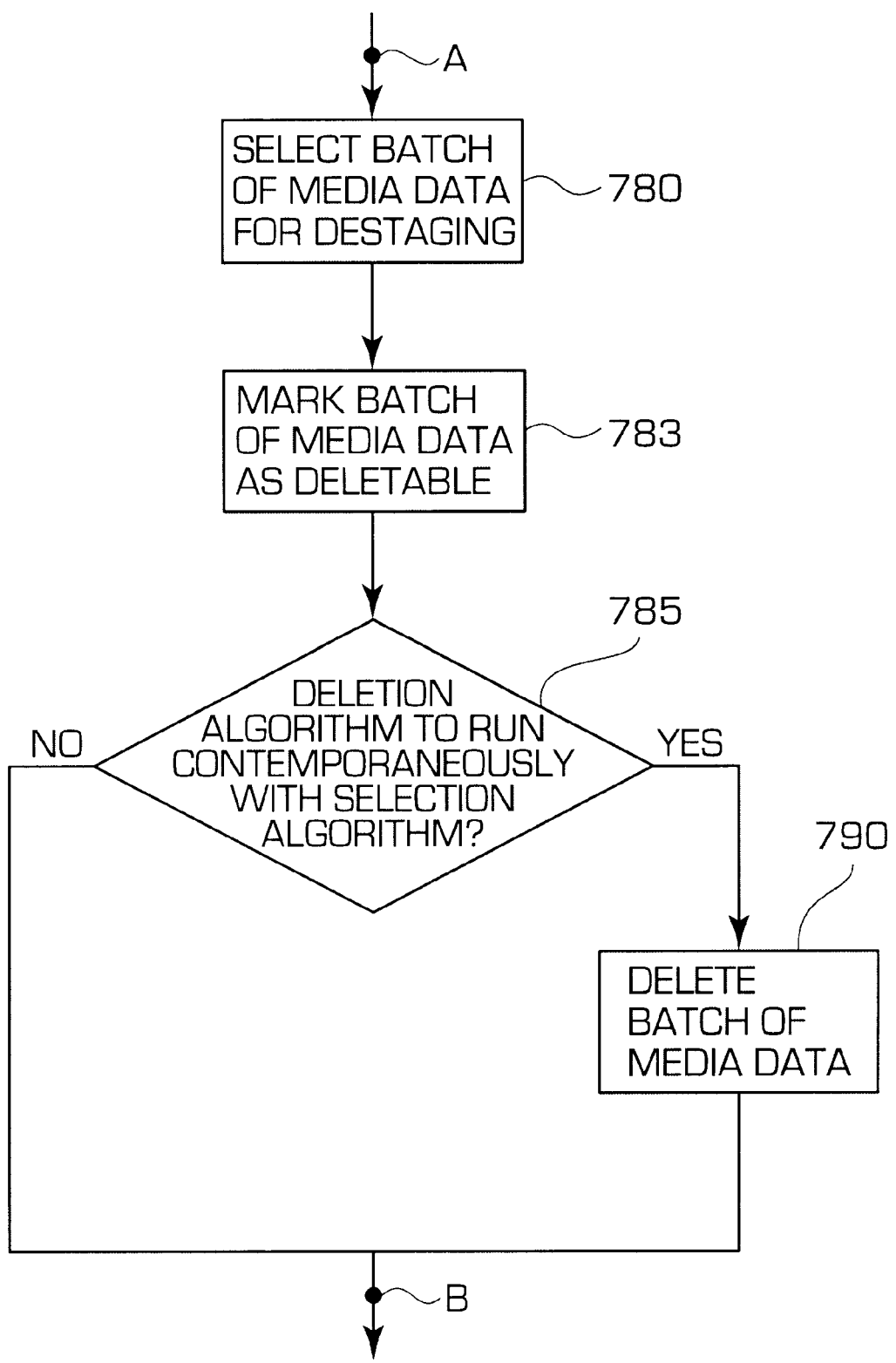

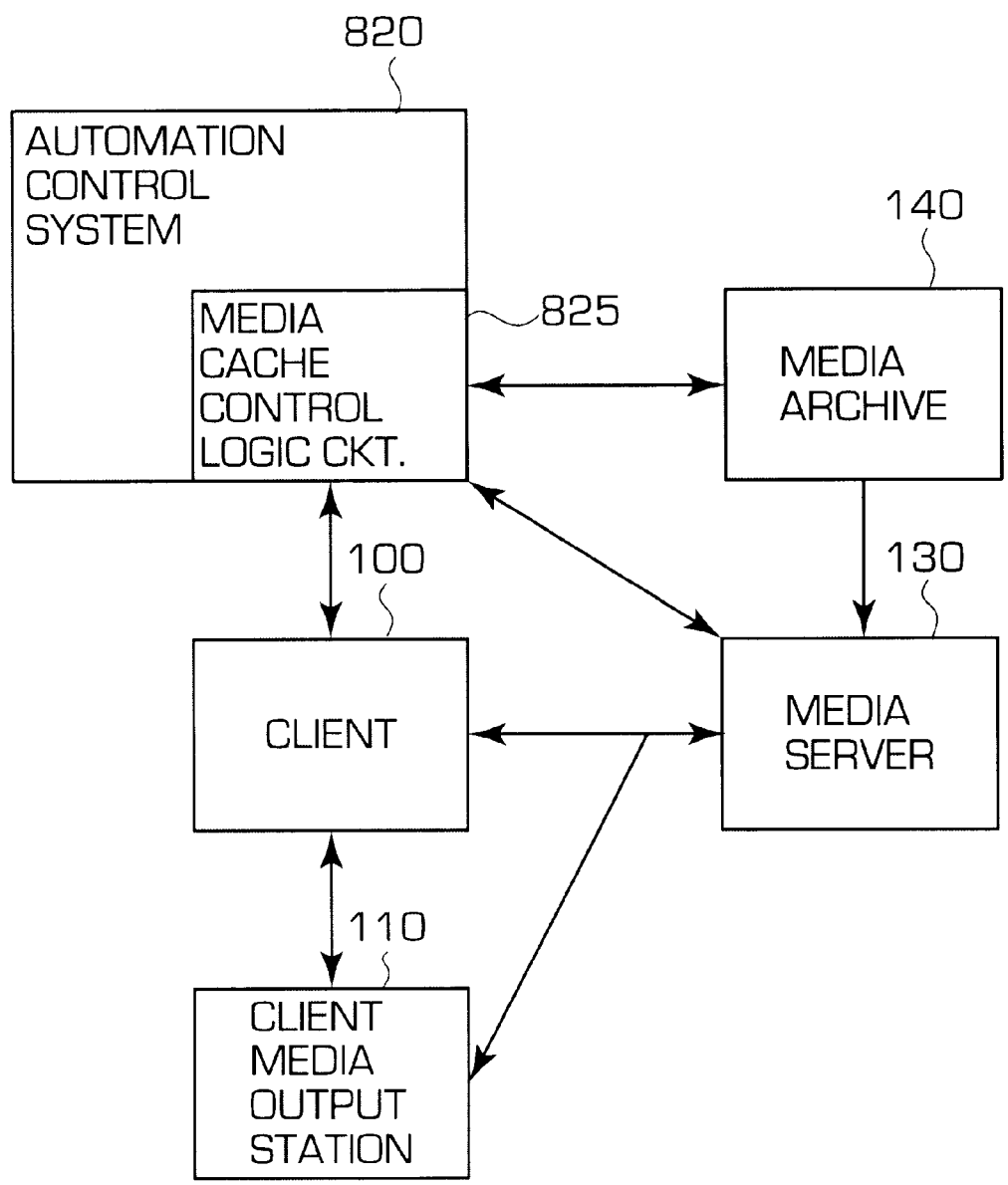

MULTIMEDIA DATA STORAGE SYSTEM AND METHOD FOR OPERATING A MEDIA SERVER AS A CACHE DEVICE AND CONTROLLING A VOLUME OF DATA IN THE MEDIA SERVER BASED ON USER-DEFINED PARAMETERS

BACKGROUND OF THE INVENTION

1. Field of the Invention

This invention is related to data storage systems and methods for storing data, and more particularly it is related to caching data and controlling the caching of data.

2. Description of the Related Art

Typically, multimedia applications require that a large reservoir of multimedia data, including audio and video data, be readily accessible for delivery to a client. Although multimedia servers are employed to deliver multimedia data, it is not practical to provide extensive data storage within these servers. Accordingly, a low-cost high-capacity media archive may be employed in order to store large volumes of multimedia data which are downloaded via the media server to a client.

One disadvantage associated with the use of a high-capacity media archive is that there is a delay in the transfer of multimedia data from the media archive to the client via the media server. Therefore, it is difficult to ensure that media data will be available for rapid delivery to a client upon request.

SUMMARY OF THE INVENTION

It is an object of the present invention to solve the above-described problem by providing for the efficient delivery of media data to a client without excessive delay. To this end, the media server must be managed so as to store multimedia data which is likely to be requested by a particular client.

In accordance with one embodiment of the present invention, a multimedia data storage system for storing multimedia data is provided which includes a media server which stores media data on a short-term basis, and a media archive which stores media data on a long-term basis relative to the media server. The media archive is connected to the media server, which operates as a cache device for the media archive, for transmission of media data between the media archive and the media server. According to the present invention, a volume of the media data stored in the media server is controlled based on user-defined parameters.

According to still another aspect of the invention, the media data includes a portion of a media object and the media server begins to output the media object upon request if the portion of the media object is at least a predetermined fraction of the media object defined by a first parameter of the user-defined parameters.

According to yet another aspect of the present invention, the media server has a maximum storage capacity. In addition, a second parameter of the user-defined parameters is provided which defines an upper capacity volume which is no more than the maximum storage capacity of the media server. Significantly, the media server reduces the volume of the media data stored therein if the volume of the media data is greater than the upper capacity volume.

According to still another embodiment of the present invention, a method is provided for managing a media server as a cache device for a media archive within a multimedia data storage system. The media server stores media data on a short-term basis, while the media archive stores media data on a long-term basis relative to the media server. The media archive is connected to the media server for transmission of media data therebetween. The inventive method includes determining a volume of the media data stored in the media server and controlling the volume of the media data stored in the media server based on user-defined parameters.

According to yet still another aspect of the inventive method, the media data includes a portion of a media object and the method further includes initiating an output of the media object from the media server upon request if the portion of the media object is at least a predetermined fraction of the media object defined by a first parameter of the user-defined parameters.

According to yet another aspect of the inventive method, the media server has a maximum storage capacity and a second parameter of the user-defined parameters is an upper capacity volume which is no more than the maximum storage capacity of the media server. Significantly, the controlling aspect of the inventive method includes reducing the volume of the media data stored in the media server when the volume of the media data is greater than the upper capacity volume.

According to another embodiment of the present invention, a computer-readable medium of instructions is provided which is to be implemented in a multimedia data storage system including a media server and a media archive. The media server stores media data on a short-term basis and the media archive stores media data on a long-term basis relative to the media server. The media archive is connected to the media server for transmission of media data therebetween. The inventive computer-readable medium of instructions includes means for determining a volume of the media data stored in the media server and means for controlling the volume of the media data stored in the media server based on user-defined parameters.

BRIEF DESCRIPTION OF THE DRAWINGS

The above and other objects and advantages of the invention will become more apparent and more readily appreciated from the following detailed description of the preferred embodiments of the invention taken in conjunction with the accompanying drawings, of which:

FIGS. 4A–4D show flow charts which incorporate the steps of the inventive method of managing a media server as a cache device for a media archive within a multimedia data storage system, according to a preferred embodiment of the invention.

FIG. 5 shows a diagram of an alternative embodiment of the inventive multimedia data storage system which includes a client, an automation control system, a media server and a media archive.

DETAILED DESCRIPTION OF THE PREFERRED EMBODIMENTS

Figure 1:
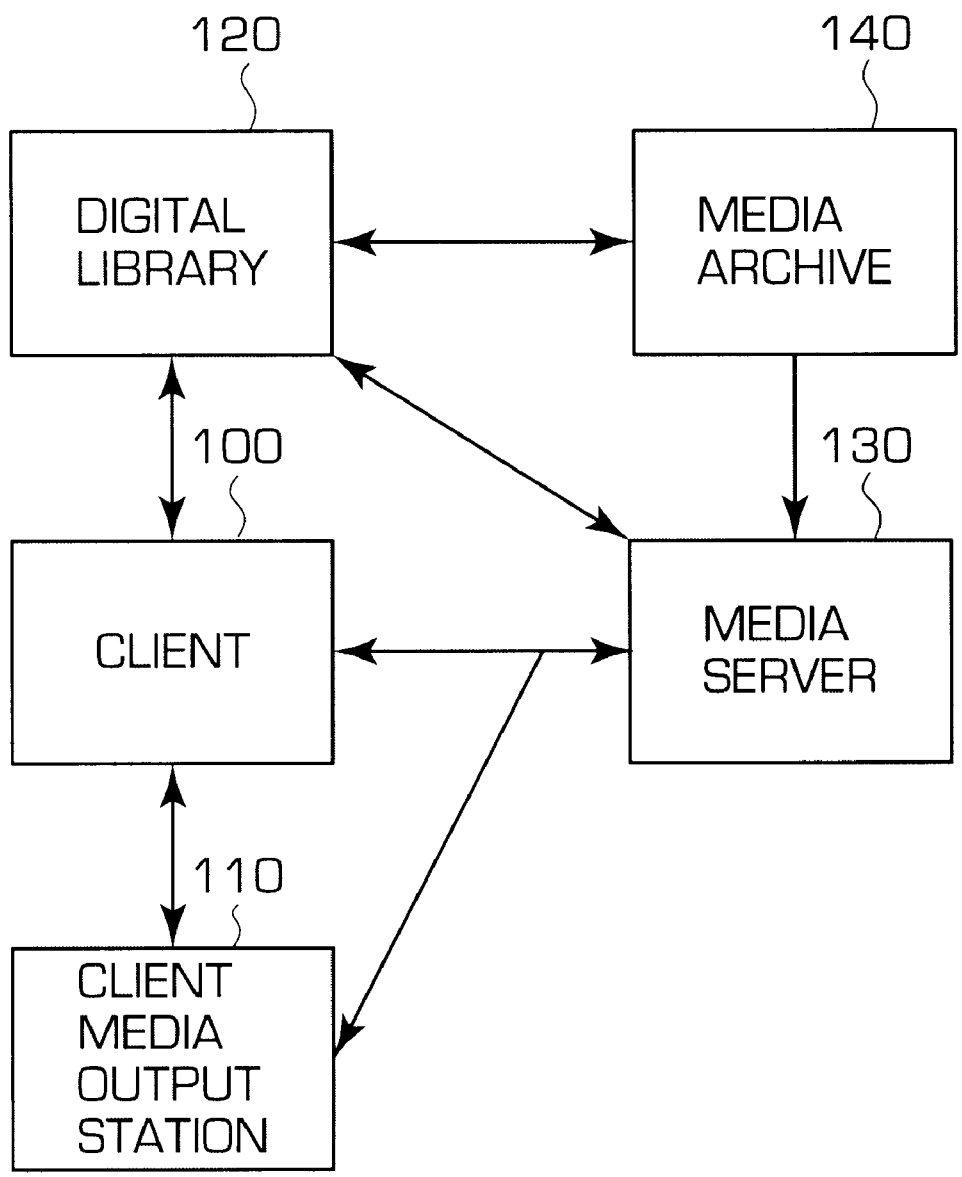
FIG. 1 shows a diagram of a multimedia data storage system according to a preferred embodiment of the present invention, which includes a library client, a digital library, a media server, and a media archive.

The preferred embodiments of the present invention are described below in more detail with reference to the above drawings, in which like reference numerals refer to the same or similar elements.

The present invention relates to the management of a media server as a cache device to a media archive in a multimedia data storage system. To this end, the management of the media server is automated such that the volume of media data stored within the media server is controlled in accordance with user-defined parameters. These parameters address the time-based utilization of media data files, the storage utilization of the media server, network bandwidth, the availability of constrained resources (i.e. tape drives in an automated tape library subsystem), and user-assigned file priorities.

The above-mentioned management scheme is designed to ensure that the most commonly accessed multimedia data files are maintained on the media server. In this regard, multimedia data files which are utilized less frequently are copied to the media archive and then deleted from the media server as necessary.

The inventive management scheme may also further optimize the use of the media server's limited storage by ensuring that only a small portion of a particular multimedia data object or file is retained within the media server. In this manner, the portion of the multimedia data file stored within the media server can be delivered to the client while the remainder is being retrieved from the media archive.

FIG. 1 depicts a multimedia data storage system according to a preferred embodiment of the present invention, which may employ a digital library, as described in U.S. Pat. No. 5,649,185 to Antognini et al., which is incorporated herein by reference. The system is computer based and includes a library client 100, a client media output station 110, the digital library 120 mentioned above, a media server 130 and a media archive 140. The relationship between the client 100 and the digital library 120 is explained in greater detail below with reference to FIG. 2 which also shows the internal elements of the digital library 120.

Figure 2:
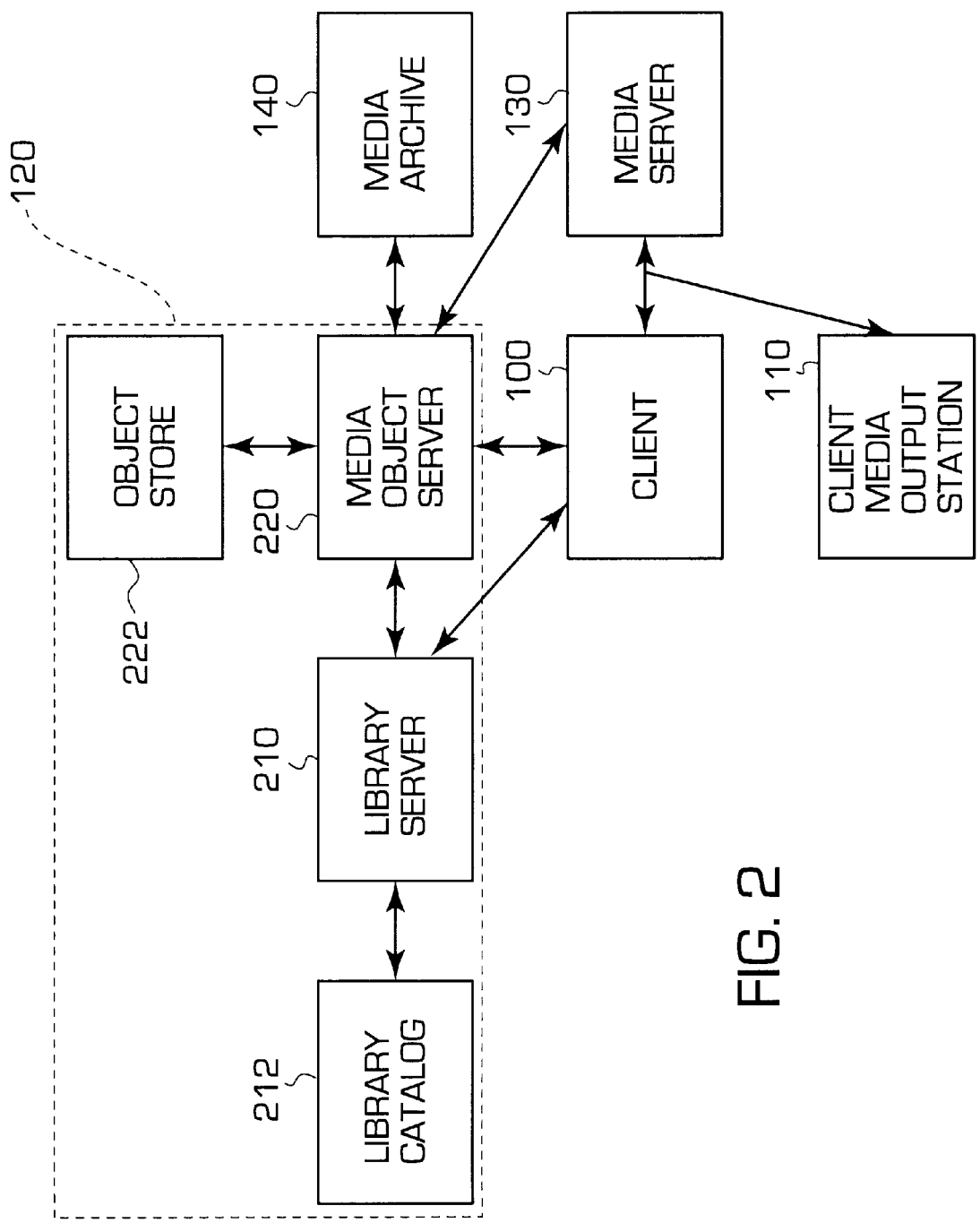
FIG. 2 shows a diagram depicting the internal elements of the digital library along with a library client which interacts with the library.

As shown in FIG. 2, the digital library 120 includes a library server 210 and at least one media object server 220 which interact with the library client 100. The library server 210 and the media object server 220 each have access to a local information store. In particular, the library server 210 has access to a library catalog 212, while the media object server 220 has access to an object store 222. Also, a communications isolator (not shown) is included which allows the library server 210, the media object server 220 and the library client 100 to communicate with one another without the client being concerned with complex communications protocols. The library server 210, the media object server 220 and the library client 100 are connected by a communications network, such as a wide-area network (WAN).

Each library client 100 sends a request to the library server 210 to store, retrieve, and update media objects which may be stored in the media object server 220, the media server 130 or the media archive 140, and to update and query the media object indexes and descriptive information stored in library catalog 12. The library client 100 requests are generated by library patrons. These patrons are users who have been granted privileges for the use of the library system.

Before a library client request is processed, library server 10 checks the library catalog 212 to ensure that the patron's name and password are valid. Next, the library server 210 ensures that the patron has been granted the appropriate privileges to perform the requested action. Each patron is assigned a set of privileges by a system administrator. An example of a library privilege is the ability to delete media objects.

Finally, the library server 210 checks to ensure that the media object's owner has granted the patron the privileges needed to do what is requested (e.g., update the media object). The owner of a media object preferably is the patron who first stored the media object. When an owner stores a media object that owner must specify which other patrons are to have access to the media object.

Media objects stored in the library system can be checked out by a patron for a specified period of time. This feature can be used to ensure that one patron's updates to a media object are not overwritten by another. While a media object is checked out by a patron, other patrons can retrieve the media object and view it, but they cannot update it. In typical implementations, there are groups of individuals who need access to the same media objects. Therefore, to simplify the process of granting access to media objects, a system administrator can define patrons as members of a group. When a patron is defined as a member of a group, that patron is able to access any media object for which the group has been granted privileges. Additionally, patrons can access media objects for which they have been specifically granted individual privileges. A patron can set default groups whose members will have access to the media objects the patron stores. When patrons store media objects, they have the option to use this default group, to grant specific privileges to groups and individual patrons, or to do both.

If a library client request involves the storage, retrieval, or update of a media object, the library server 210 forwards the request to the media object server 220, which manages the storage of media object(s) referred to in the request, based upon information provided by library catalog 212. If the library client request is a query of the information stored in the library catalog 212, the library server 210 will interact only with the library catalog 212 and will not contact the media object server 220.

The library catalog is analogous to a conventional library's card catalog. It is a single set of database tables which contain an index of all the media objects stored in the library system. In addition, it can store information such as textual descriptions for each media object, information on the type of media object (e.g., image object, spreadsheet, text document), library patron names and privileges, access authorization data for each media object, links between objects. The library catalog can also store a virtually unlimited number of property type/property value pairs for each object (e.g., movie/TRUE LIES, movie_type/ACTION). These property type/property value pairs are known as an object's properties.

As noted above, the media object server 220 is the device which manages the storage of media objects within the library system. In this regard, the media object server 220 manages the storage of media objects independent of whether they are stored locally in the media object store 222 or at a remote location within, for example, the media server 130 or the media archive 140. The media object server 220 receives requests from the library server 210 and communicates with the library client 100 to complete the requests.

The digital library can contain several distributed media object servers. Each of these object servers is computer based and is provided with software to facilitate managing the storage of media objects. This software may be stored in a computer readable medium of instructions such as a hard drive, an optical disk drive, or a similar device employing a computer readable format. The advantage of distributed media object storage is that it helps to reduce the costs associated with sending media objects over communications lines and provides better performance in storing and retrieving media objects.

When a library patron's privileges are defined, a default media object server can be set for the patron. When a patron stores a media object, it will be stored in the default media object server for that patron unless there is a dedicated media server which handles that particular media object server.

If it is later determined that a media object or a group of media objects should be relocated to a different media object server or media server, a client application can move the media objects from one media object server to another. A system managed storage method, such as that disclosed in a U.S. patent application Ser. No. 08/036,305 filed Mar. 24, 1993 and assigned to IBM Corporation, entitled "A Method And System For Parallel, System Managed Storage For Objects On Multiple Servers" by T. G. Burket et al. which is incorporated herein by reference, provides a means for moving a media object from one media object server to another.

The library client 100 is the interface through which application programs can submit requests to the library system. These can include requests to store and retrieve media objects, update/add descriptors to media objects, delete media objects and query information in the library catalog. Library requests can be submitted through the library client either individually or in batches.

Because of the demands on the media object server 220 for a variety of media data, it is often the case that a dedicated media server should be provided in order to facilitate the delivery of a particular kind of media to the library patron. In this regard, the multimedia storage system of FIG. 1 is provided with a separate media server 130 which may be, for example, a dedicated video or audio server. In order to supply a substantial volume of video objects on demand, a large amount of media data in the form of media objects must be stored within the multimedia data storage system.

As noted above, it is expensive to utilize the media object server 220 or the media server 130 as a warehouse for all of the video objects which might be requested by a user. Thus, a media archive 140 is employed in order to store video data on a long-term basis, while a media server 130 is employed to store video data on a short-term basis. In this regard, more than one media server 130 may be provided. The media archive 140 and the media server 130 are connected so as to transmit media data therebetween. In addition, the video archive 140 may be provided with tape drives (not shown) to facilitate the storage of media data.

By way of example, the media archive 140 and media server 130 may be connected via a high bandwidth load channel. In this way, the media data stored in the media archive 140 may be quickly delivered to the dedicated media server 130 under the control of the media object server 220. The media server 130 will then deliver the same to a dedicated client media output station 110 such as a client viewer including a video display, which is separate from the client 100. Alternatively, the client media output station 110 may be included in the client 100. The video display may be a television, a broadcast monitor, or a computer terminal including a CRT tube or a flat panel display. In addition, the media data may be delivered to the client media output station 110 as an asynchronous transfer mode (ATM) based video stream.

According to one aspect of the invention, the media archive 140 may relinquish control over a media object or a group of media objects to the client 100, so that the later may instruct the media server 130 to output the media object(s) to the client media output station 110.

As a consequence of utilizing a media server 130 having a limited data storage capability, it is important that the media server 130 and the media archive 140 be carefully managed so that the media data which is most likely to be requested by a user may be stored within the media server 130 for immediate delivery to the client media output station 110. The remaining media data being stored within the media archive 140 may be retrieved as needed.

To this end, the present invention controls the volume of media data stored in the media server 130 based on user-defined parameters. These user-defined parameters include, but are not limited to the eight parameters discussed below. These parameters may be influenced by the available bandwidth of the multimedia data storage system.

The first parameter defines a predetermined fraction of a media object which must be retained within the media server 130 before the output of the media data to the client media output station 110 can be commenced.

The second parameter defines an upper capacity volume which corresponds to a volume of media data that the media server 130 can store internally before a destaging process is commenced. This destaging process transfers the media data from the media server 130 to the media archive 140 so that the media data can be made deletable to make room for other media data as discussed below. In this way, the media data stored in the media server 130 can be reduced.

A third parameter defines the lower capacity volume of the media server 130, which corresponds to a volume of media data that when reached signifies that the destaging process is terminated.

A fourth parameter defines a predetermined period of time that is selected by the user during which the destaging process can be accomplished.

With regard to the destaging process, it is useful to consider the media data stored in the media server 130 as including first and second portions. The first portion of the media data stored in the media server 130 corresponds to a portion of the media data which remains after reduction of the volume of the media data. The second portion of the media data corresponds to a portion of the media data which is to be deleted from the media server 130 during reduction of the volume of the media data stored therein.

According to one aspect of the present invention, the second portion of the media data may be stored in the media archive 140 prior to being deleted from the media server 130 during reduction of the volume of the media data stored therein.

A fifth parameter defines a selection algorithm by which the second portion of the media data is selected for the destaging process. By way of example, the selection algorithm may be based on a first in first out (FIFO) scheme. Alternatively, the selection algorithm may be based on a predefined priority scheme in which each media object included within the second portion of the media data stored in the media server 130 is selected in accordance with a priority level which is assigned to the media object, the lower priority level media objects being selected first. In this regard, a group of media objects may be assigned a common priority level.

A sixth parameter of the user-defined parameters defines a deletion algorithm by which the second portion of the media data is deleted. By way of example, the deletion algorithm may be based on a scheme in which the least recently used media data is deleted first from the media server. Alternatively, the deletion algorithm may correspond to the priority scheme described above in connection with the selection algorithm.

A seventh parameter of the user-defined parameters defines predefined amounts of the media data, by which the volume of the media data stored in the media server 130 is reduced. By way of example, the volume of the media data stored in the media server 130 may be reduced by 10 gigabytes at a time. Each predefined amount of the media data may be defined as a percentage of the total cache storage of the media server 130. The total cache storage of the media server 130 may be, for example, 800 gigabytes.

In the same vein, an eighth parameter of the user-defined parameters may be employed which defines a predetermined amount of the second portion of the media data stored in the media server 130 which is to be deleted from the media server 130. By way of example, the second portion of the media data stored in the media server 130 may be deleted 10 gigabytes at a time. Alternatively, the predetermined amount may correspond to a media object or multiple media objects. In this regard, a single media object may correspond to a segment of a television show.

The operational aspects of the media server 130 as they relate to managing the same as a cache device to the media archive 140 include four main components, as discussed below.

The first component involves the loading of new media objects, such as videos, audio files, or other types of objects, within the multimedia data storage system. If these media objects relate to a specific dedicated media server 130, then they are stored initially in the media server 130. Accordingly, if a video object is to be stored within the multimedia data storage system, then the video object is initially stored within the media server 130 which, in this case, will also be a video server.

The second component involves the retrieval of media objects stored within the media server 130. As noted above, any access request for a particular media object by the client 100 is sent from the library server 210 to the media object server 220, which updates the access data associated with the media object. This access data includes the time and date of the access request, the time and date of the most recent access request and the status of the media object (i.e. whether the object is deletable because it is stored in the media archive 140).

Thereafter, the media object server 220 determines whether the object is stored in the media server 130 or the media archive 140. If the media object is located within a cache memory (i.e disk(s) which are not shown) of the media server 130, then it is transferred by the media server 130 to the client media output station 110 under the control of the media object server 220. The graphical user interface is generated by the client 100.

If the media object is not located within the media server 130, then it is staged (i.e. transferred) from the media archive 140 to the media server 130 in the manner described below. Thereafter, the status of the media object is passed from the media server 130 to the media object server 220 so that the media object server 220 can update the access information associated with the media object. However, the media object retrieved from the media archive 140 and stored in the media server 130 is marked as deletable because it is still stored within the media archive 140 as well.

Once the access information has been updated, the media object is transferred to the client media output station 110. However, the output of the media object can commence even though the staging process is not yet complete.

According to one aspect of the invention, the media object may be output from the media server 130 as soon as a portion of the media object is stored within the media server 130 which is at least a predetermined fraction of the media object defined by the first parameter described above.

Figure 3:
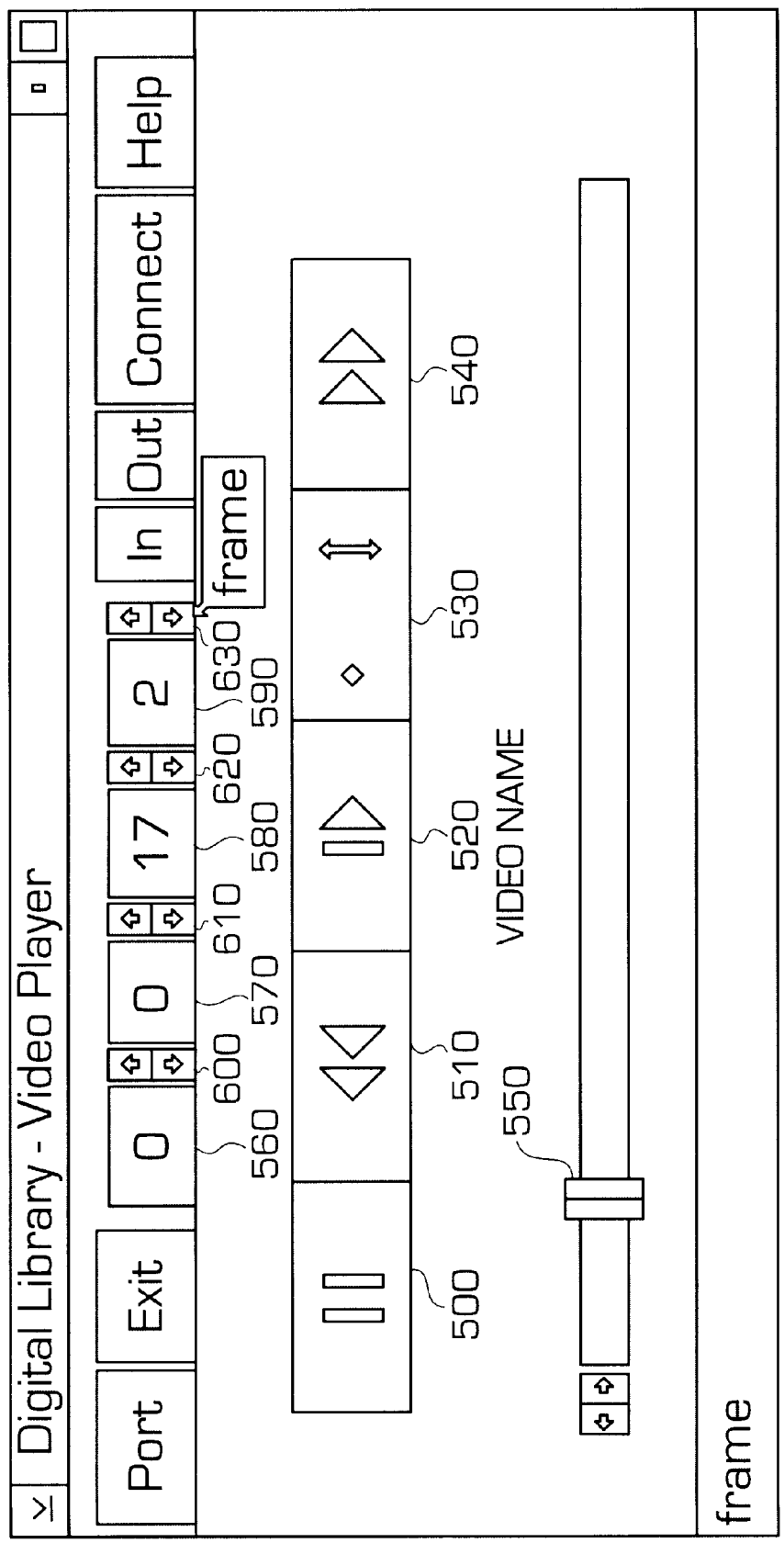
FIG. 3 shows a graphical user interface which incorporates an aspect of the present invention.

The present invention may also employ a graphical user interface to control the output of the media object from the media server 130 to the client media output station 110. An exemplary graphical user interface, which is shown in FIG. 3, includes a number of control buttons and a slide bar for entering commands in order to control the output of a video object (i.e. media object) from the media server 130 to the client media output station 110.

Control buttons 500–540 correspond to functions which are usually associated with conventional VCR's. Specifically, control button 500 corresponds to a pause command by which a portion of a video object currently being played is paused. Control button 510 corresponds to a rewind command by which the portion of the video currently being played is rewound towards the beginning of that portion. Control button 520 corresponds to a play command by which the video object is played at normal speed. Control button 530 corresponds to a slow forward command by which the video object is played at half its normal speed.

Control button 540 corresponds to a fast forward command by which the video object is played at three times the normal speed. However, according to the present invention, the control button 540 is enabled only if the portion of the video object stored within the media server 130 is sufficiently large to allow for the use of the control button 540. Thus, if the user tries to speed up the output of the video object to the client media output station 110 when there is not enough of the video object stored within the media server 130 to accommodate the user's demand for increased output, then the control button 540 will be disabled. The point at which the control button 540 will be disabled depends on the bandwidth of the channel linking the media server 130 and the media archive 140, and the current size of the portion of the video object which is stored in the media server 130.

The video player's graphical user interface may also include a control button (not shown) which corresponds to a stop command by which the portion of the video data is halted and removed from the video display.

Also included within the video player's graphical user interface is a slide bar 550. The slide bar allows direct access to any position within the video object which is proportional to the entire duration of the video object. However, the slide bar 550 only provides for relatively large jumps from one frame of digital video data to another, the jumps being taken in both the forward and backward direction. If only a portion of the video object is stored in the media server 130, the size of the slide bar 550 shown in the graphical user interface will depend on the size of the portion of the video object which is stored in the media server 130 and the bandwidth of the channel which connects the media server 130 and the media archive 140. Accordingly, the smaller the portion of the video object stored in the media server 130, the shorter the slide bar 550 will appear on the graphical user interface.

An additional aspect of the video player's graphical user interface is the ability to display indexing information corresponding to time codes. To accomplish the display of indexing information, four time code display windows 560–590 are provided as part of the graphical user interface which depict the hour, minute, second, and frame, respectively, associated with a particular time code.

When the user actuates the slide bar 550 via a mouse or some other entry device which is included on the computer in which the client 100 is provided, the user sees the corresponding change in the display of indexing information 560–590.

In order to accomplish smaller jumps within the segment of digital video data, four time code buttons 600–630 are provided on the graphical user interface. A first time code buttons 600 allows for the user to jump within the segment of digital video data in hour increments. A second time code button 610 allows the user to jump within the portion of the video object in minute increments. A third time code button 620 allows the user to jump within the portion of the video object in second increments. Finally, a fourth time code button 630 allows the user to jump within the portion of the video object in discrete frame increments.

Once a time code entry has been made via the time code buttons 600–630, the client 100 will request that the media server 130 start the play-back of that portion of the video object starting from the frame associated with the time code entry on the video display. However, according to the present invention, the time code buttons 600–630 may be disabled if the portion of the video object stored in the media server 130 is too small to support the requested jump.

Additional aspects of the graphical user interface described above are mentioned in detail in U.S. application Ser. No. 08/688,114, filed Jul. 29, 1996, and entitled "Method for Relating Indexing Information associated with at least Two Indexing Schemes to Facilitate the Play-Back of User-Specified Digital Video Data and a Video Client Incorporating the Same" by Kozina et al. U.S. application Ser. No. 08/688,114, which is assigned to IBM, is incorporated herein by reference.

The third component involves the destaging process mentioned above, in which media objects stored within the media server 130 are moved to the media archive 140 under the control of the media object server 220. In contrast to the destaging process, the staging process, mentioned above, involves the transfer of media objects from the media archive 140 to the media server 130. After the media object is copied to the media archive 140, it is validated for size and integrity so that the copy of the media object stored in the media server 130 may be marked as deletable.

The fourth component involves a deletion process, which is also an important aspect of the present invention. The deletion process may run after or simultaneously with the destaging process and involves deleting media objects which have been marked deletable.

The destaging and deletion processes are important aspects of the management scheme of the present invention and are described below in greater detail with reference to FIGS. 4A–4D. In this regard, the removal of media data from the media server is orchestrated so that there will be sufficient space for media data which is requested by the library patron. Advantageously, media data which is less likely to be requested by a library patron may be removed first so that there is a greater likelihood that the remaining data will have a higher probability of being requested by that patron.

Figure 4A:
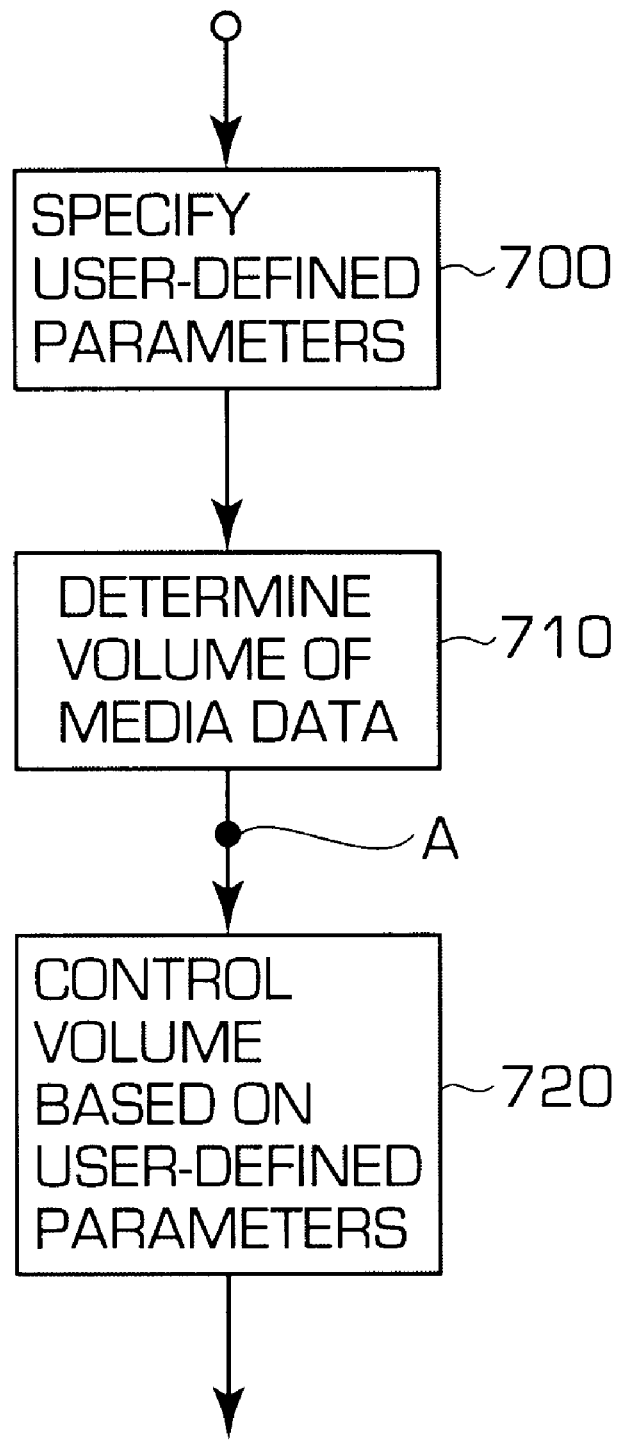

Referring to FIG. 4A, the user initially specifies in step 700 user-defined parameters which are to be used in the destaging and deletion processes. Thereafter, a volume of the media data stored in the media server 130 is determined in step 710. Finally, the volume of the media data stored in the media server 130 is controlled based on the specified user-defined parameters.

Figure 4B:
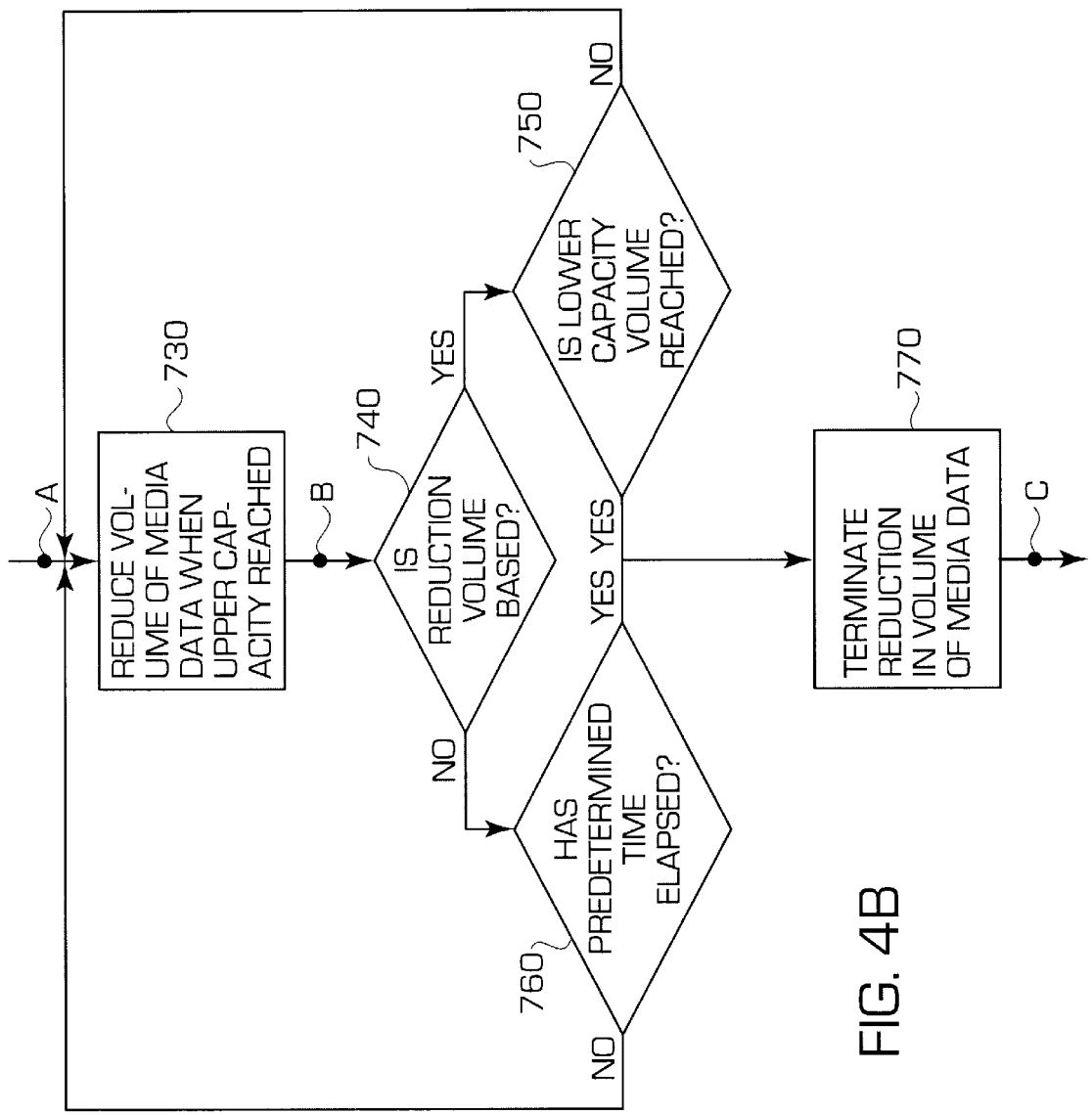

As noted above, the second parameter of the user-defined parameters is an upper capacity volume which is no more than the maximum storage capacity of the media server 130. In this regard, the volume of the media data stored in the media server 130 is reduced in step 730, as shown in FIG. 4B, when the volume of the media data reaches the upper capacity volume. FIG. 4B depicts additional aspects of the controlling step 720 mentioned above.

Thereafter, it is determined in step 740 whether the reduction in the volume of media data has been completed based on the volume itself. If the reduction in volume is itself based on volume, then in step 750 it is determined whether the volume of the media data stored in the media server 130 has been reduced to a lower capacity volume of the media server which corresponds to the third parameter mentioned above. If the volume has not been reduced to the lower capacity volume, then step 730 is repeated. If, however, the volume of the media data has been reduced to the lower capacity volume then step 770 is performed, in which the reduction procedure is terminated.

If it is determined in step 740 that the reduction is not volume based, then in step 760 it is determined whether a predetermined period of time corresponding to the fourth parameter mentioned above has elapsed. If the predetermined period of time has not elapsed, then the reduction step 730 is repeated. However, if the predetermined period of time has elapsed, then the termination step 770 is performed.

As noted above, the media data includes first and second portions. According to the present invention, the second portion of the media data is deleted from the media server 130, whereas the first portion of the media data corresponds to a portion of the media data stored in the media server 130 which remains after a reduction in the volume of the media data has been achieved.

Turning to FIG. 4C, which shows aspects of the reduction step 730 depicted in FIG. 4B, the above-mentioned second portion of the media data may be selected in batches for destaging, which correspond to predefined amounts, in step 780 in accordance with a selection algorithm defined by the fifth parameter mentioned above. However, these batches need not correspond to specific blocks of memory. Rather, the predefined amounts may correspond to media object(s). Subsequently, in step 783, the selected batch or batches may be marked as deletable.

Thereafter, it is determined in step 785 whether the deletion algorithm is to run contemporaneously with the selection algorithm in accordance with a user's preference. If the two algorithms are to run simultaneously, then step 790 is performed, in which the selected batch of the second portion of the media data is deleted in accordance with a deletion algorithm defined by the sixth parameter mentioned above. The deleted batches correspond to predefined amounts of the media data whose size are set by the eighth parameter mentioned above. In this regard, the sizes of the selected and deleted batches are the same when the selection and deletion algorithms are carried out contemporaneously. Preferably, the second portion of the media data may be stored in the media archive 140 prior to its deletion from the media server.

Figure 4D:
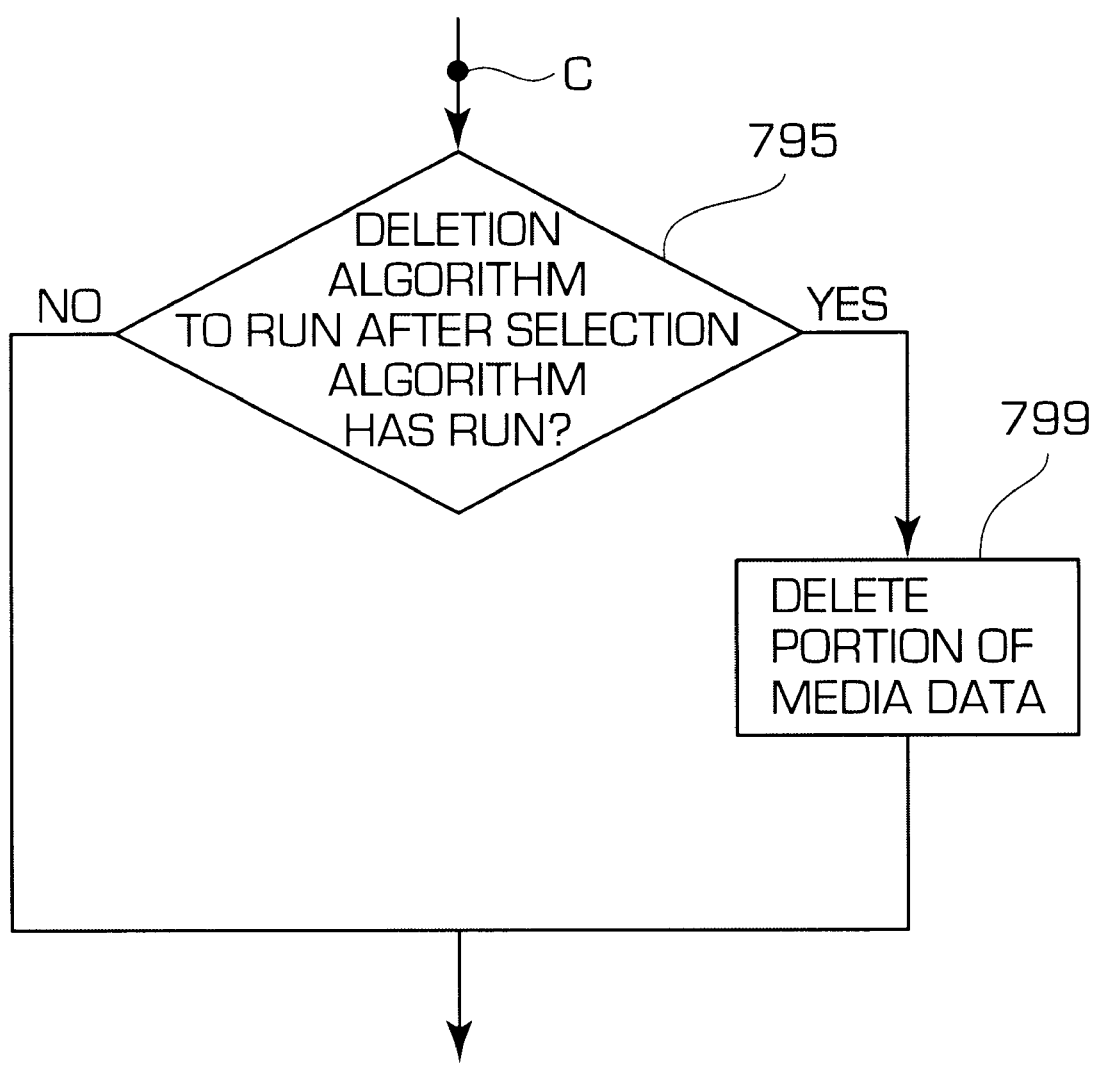

If it is determined in step 785 that the deletion and selection algorithms do not run contemporaneously, then step 740 is performed as described above. Thereafter, in step 795, as shown in FIG. 4D, which follows step 770 shown in FIG. 4B, it is determined whether the deletion algorithm is to run after the selection algorithm has run. If this is the case, then in step 799, the second portion of the media data which includes the selected batches will be deleted in accordance with a deletion algorithm defined by the sixth parameter discussed above. In this regard, the deletion batch size may be different from the selected batch size, as determined by the seventh and eighth parameters.

After the deletion algorithm has been run, or in the case in which the deletion algorithm does not run after the selection algorithm has run, as determined in step 795, the destaging and deletion processes mentioned are complete.

A second embodiment of the present invention is described below in connection with FIG. 5. The second embodiment employs an automation control system 820 (which may be a broadcast automation control system) instead of a digital library (element 120 of FIG. 1). In contrast to the multimedia data storage system including the digital library, which is not provided for real-time delivery of multimedia, the multimedia data storage system including the automation control system may be employed in a broadcast environment in which real-time control is critical. Accordingly, the broadcast automation control system must control the delivery of media objects from the media server 130 to the client media output station 110 so that they are output according to an exact schedule.

To this end, the automation control system 820 is provided with a media cache control logic circuit 825 which previews a schedule corresponding to the times and dates when media objects must be delivered for output. The media cache control logic circuit 825 then controls the destaging of the media objects from the media archive 140 to the media server 130 prior to the output of those media objects. In this way, the media objects will be ready for output according to the predefined schedule. The above-mentioned schedule is generated by the client 100 and output to the broadcast automation control system 820.

With regard to the destaging and deletion of media objects, the multimedia data storage system employing the automation control system 820 is similar to the one described above in connection with the digital library. However, the selection algorithm defined by the fifth parameter may be based on a scheme in which media objects are selected after the last repeated play (if any) in the schedule. The deletion algorithm defined by the sixth parameter may also be based on a similar scheme.

The automation control system 820 may be, for example, a Louth System, manufactured by LOUTH AUTOMATION in Menlo Park, Calif. In particular, the automation control system may be the LOUTH ADC-100, which is well known in the art. The media objects stored in the multimedia data storage system of the second embodiment may correspond to text, video or audio files, or some combination of those files. In addition, the broadcast automation control system may be implemented as a component of a digital library.

Although certain preferred embodiments of the present invention have been described, the spirit and scope of the invention is by no means restricted to what is described above. For example, multiple groups of user-defined parameters may be specified without departing from the scope of the present invention.

What is claimed is:

1. A multimedia data storage system for storing multimedia data comprising a media server which stores media data on a short-term basis, and a media archive which stores media data on a long-term basis relative to the media server, said media archive being connected to said media server for transmission of media data therebetween;

wherein said media server operates as a cache device for said media archive, and wherein a volume of the media data stored in said media server is controlled based on user-defined parameters;

wherein said media server has a maximum storage capacity, and wherein a second parameter of the user defined parameters is an upper capacity volume which is no more than the maximum storage capacity of said media server, said media server reducing the volume of the media data stored therein if the volume of the media data is greater than the upper capacity volume;

wherein said media server reduces the volume of the media data stored therein until the volume reaches a lower capacity volume of said media server which corresponds to a third parameter of the user-defined parameters;

wherein the media data stored in said media server includes first and second portions, the first portion of the media data corresponding to a portion of the media data which remains after reduction of the volume of the media data, the second portion of media data corresponding to a portion of the media data which is to be deleted from said media server during reduction of the volume of the media data; and wherein the second portion of the media data is stored in said media archive prior to being deleted from said media server during reduction of the volume of the media data.

2. The multimedia data storage system defined by claim 1, wherein the second portion of media data is selected in accordance with a selection algorithm defined by a fifth parameter of the user-defined parameters.

3. The multimedia data storage system defined by claim 2, wherein the selection algorithm is based on a first-in first-out (FIFO) scheme.

4. The multimedia data storage system defined by claim 2, wherein the selection algorithm may be based on a priority level of media objects included within the second portion of media data.

5. The multimedia data storage system defined by claim 1, wherein the second portion of the media data is deleted in accordance with a deletion algorithm defined by a sixth parameter of the user-defined parameters.

6. The multimedia data storage system defined by claim 5, wherein the deletion algorithm is based on a scheme in which the least recently used media data is deleted first from said media server.

7. A method of managing a media server as a cache device for a media archive within a multimedia data storage system, said media server storing media data on a short-term basis, said media archive storing media data on a long-term basis relative to the media server, said media archive being connected to said media server for transmission of media data therebetween, said method comprising;

determining a volume of the media data stored in said media server; and controlling the volume of the media data stored in said media server based on user defined parameters;

wherein said media server has a maximum storage capacity, wherein a second parameter of the user-defined parameters is an upper capacity volume which is no more than the maximum storage capacity of said media server, and wherein said controlling further comprises;

reducing the volume of the media data stored in said media server when the volume of the media data is greater than the upper capacity volume;

wherein in said reducing, the volume of the media data stored in said media server is continuously reduced until the volume reaches a lower capacity volume of said media server which corresponds to a third parameter of the user-defined parameters;

wherein the volume of media data includes first and second portions of media data, and wherein said reducing comprises deleting the second portion of the media data from said media server, the first portion of the media data corresponding to a portion of the media data stored in said media server which remains after reduction of the volume of the media data; and wherein said reducing further comprises storing the second portion of the media data in said media archive prior to the second portion of the media data being deleted from said media server.

8. The method of managing defined by claim 7, wherein the second portion of the media data is selected in accordance with a selection algorithm defined by a fifth parameter of the user-defined parameters.

9. The method of managing defined by claim 8, wherein the second portion of the media data is deleted in accordance with a deletion algorithm defined by a sixth parameter of the user-defined parameters.

10. The method of managing defined by claim 9, wherein the selection algorithm is based on a first-in first-out (FIFO) scheme.

11. The method of managing defined by claim 10, wherein the deletion algorithm is based on a scheme in which the least recently used media data is deleted first from said media server.

12. The method defined by claim 8, wherein the selection algorithm is based on a priority level of media objects included within the second portion of the media data.

* * * * *